United States Patent [19]

Cheng et al.

[11] Patent Number: 5,053,641
[45] Date of Patent: Oct. 1, 1991

[54] TUNABLE OPTICAL PARAMETRIC OSCILLATOR

[75] Inventors: Lap K. Cheng, Newark, Del.; Walter R. Bosenberg; Chung L. Tang, both of Ithaca, N.Y.

[73] Assignee: Cornell Research Foundation, Inc., Ithaca, N.Y.

[21] Appl. No.: 379,781

[22] Filed: Jul. 14, 1989

[51] Int. Cl.$^5$ .............................................. H03F 7/00
[52] U.S. Cl. .................................... 359/330; 372/20; 372/21
[58] Field of Search .................. 307/425, 428; 372/21, 372/22, 20

[56] References Cited

U.S. PATENT DOCUMENTS

| | | | |
|---|---|---|---|
| 3,548,199 | 12/1970 | Geusic et al. | 307/88.3 |
| 3,922,561 | 11/1975 | Byer et al. | 307/428 |
| 3,934,154 | 1/1976 | Cook, Jr. | 307/88.3 |
| 4,085,335 | 4/1978 | Guilino | 307/425 |
| 4,517,675 | 5/1985 | Mourou et al. | 372/53 |
| 4,612,641 | 9/1986 | Corkum | 372/25 |
| 4,639,923 | 1/1987 | Tang et al. | 307/428 |
| 4,641,312 | 2/1987 | Schafer | 372/25 |
| 4,646,308 | 2/1987 | Kafka et al. | 372/25 |
| 4,791,631 | 12/1988 | Baumart et al. | 372/21 |
| 4,793,894 | 12/1988 | Jacco et al. | 156/623 |
| 4,815,080 | 3/1989 | Chesnoy et al. | 372/30 |

OTHER PUBLICATIONS

"High Power BaB$_2$O$_4$ Visible Optical Parametric Oscillator Pumped by Single-Axial-Mode 355-nm Pulses" by Y. X. Fan et al., CLEO '88 Post Deadline Paper pp. 527-528 PD31-1.
"Beta-Barium Borate Optical Parametric Oscillator" by Komine CLEO '88 Post Deadline pp. 529-530, PD31-1.
"Demonstration of Optical Parametric Oscillation in $\beta$BaB$_2$O$_4$ in the Visible and Near Infrared" by Cheng et al., CLEO "88 Post Deadline Paper PD33—(1-2).
"Synchronously Pumped Optical Parametric Oscillation in Beta-Barium Borate" Bromley et al Optics Communications vol. 67, No. 4, Jul. 15, 1988, pp. 316-320.
"Continuous Parametric Generation of Picosecond Light Pulses" Piskarskas et al, Soviet Journal of Quantum Electronics, 18, 155, 1988.
"Synchronously Pumped Optical Parametric Oscillation in KTP" Bromley et al Optics Communications, vol. 70, No. 4, Mar. 15, 1989, pp. 350-354.
"Parametric Chirp and 20-fold Compression of Pulses from a quasi-cw Picosecond Optical Parametric Oscillator", Soviet Journal Quantum Electron., 15 (11) Nov. 1985, pp. 1539-1541.
"Picosecond Optical Parametric Oscillator Pumped by Temporally Compressed Pulses from a Q-switched, Mode-Locked, CW-Pumped Nd:YAG laser" Optics Letters, Jun. 1, 1989, vol. 14, No. 11, pp. 557-559; Piskarskas et al.
"Generation of Synchronized Ultraviolet and Red Femtosecond Pulses by Intracavity Frequency Doubling" Focht et al; IEEE Journal of Quantum Electronics, vol. 24, No. 2, Feb. 1988, pp. 431-434.
"Generation of Femtosecond UV Pulses by Intracavity Frequency Doubling in a Modelocked Dye Laser", Laermer et al, Jun. 1, 1988, Optics Communications, vol. 67, No. 1, pp. 58-62.
"Flux Growth of Large Single Crystals of Low Temperature Phase Barium Metaborate", Jiang et al, Journal of Crystal Growth, 79, (1986) pp. 963-969.
"Femtosecond Ultraviolet Pulse Generation in -BaB$_2$O$_4$", Edelstein et al, Appl. Phys. Lett. 52 (26) Jun. 27, 1988, pp. 2211 $\propto$ 2213.
"A New-Type Ultraviolet SHG Crystal -$\beta$-BaB$_2$B$_4$" Chen et al., Scientia Sinica, vo. 28, No. 3, 1985, pp. 235-243.

(List continued on next page.)

Primary Examiner—James W. Davie
Attorney, Agent, or Firm—Jones, Tullar & Cooper

[57] ABSTRACT

The operation of a $\beta$-BaB$_2$O$_4$ optical parametric oscillator is disclosed. The oscillator is tunable in the visible and near infrared. For example, a $\beta$-BaB$_2$O$_4$ crystal 10.5 × 10.5 nm$^2$ × 11.5 mm, cut at $\theta = 30°$ was pumped at 354.7 mm, and was tunable through 0.45-1.68 $\mu$m, with a total energy conversion efficiency of 9.4%.

6 Claims, 2 Drawing Sheets

OTHER PUBLICATIONS

"Optical, Mechanical, and Thermal Properties of Barium Borate" Eimerl et al., *J. Appl. Phys.* 62(5), 1987, pp. 1968–1983.

"Flux Growth of Large Single Crystals of Low Temperature Phase Barium Metaborate" Jiang et al, *Journal of Crystal Growth* 79 (1986) 963–969.

"Recent Developments in Barium Borate" Cheng et al., *SPIE Proceedings*, vol. 681, p. 12, 1987.

"Efficient Deep-Ultraviolet Generation by Frequency Doubling in $\beta$-BaB$_2$B$_4$O$_4$ Crystals" Miyazaki et al., *Optics Letters*, Dec. 1986, vol. 11, No. 12, pp. 797–799.

"Femtosecond Ultraviolet Pulse Generation in $\beta$-BaB$_2$O$_4$" Edelstein et al, *Appl. Phys. Lett.* 52 (26) Jun. 1988, pp. 2211–2213.

"Measurement of Ultrashort Optical Pulses with $\beta$-BaB$_2$B$_4$O$_4$" Cheng et al., Appl. Phys. Lett. 52(7), Feb. 1988, pp. 519–521.

"Growth and Characterization of Low Temperature Phase Barium Metaborate Crystals", Cheng et al, *Journal of Crystal Growth* 89 1988, pp. 553–559.

"Linear Electro—Optic Effect in Barium Metaborate", Nakatani et al., *Appl. Phys. Lett.* 52 (16) 1988, pp. 1288–1290.

"Second Harmonic Generation to 2048 A in $\beta$-BaB$_2$O$_4$", Kato IEEE Journal of Quantum Electronics vol. QE22, 1986, pp. 1013–1014.

"Widely Tunable Optical Parametric Oscillator Using Urea", Rosker et al., Journal of the Optical Society of America B, vol. 2, pp. 691–696 1985.

"Optical Parametric Oscillation in a Beta-Barium Borate Crystal Pumped by an XeCl Excimer Laser" *Optics Letters*, vol. 13, No. 8, Aug. 1988, pp. 643–645.

"Visible BaB$_2$O$_4$ Optical Parametric Oscillator Pumped at 355 nm by a Single-Axial-Mode Pulsed Source", Fan et al., *Appl. Phys. Lett.* 53 (21) Nov. 1988, pp. 2014–2016.

"Barium Borate Optical Parametric Oscillator" Fan et al., *IEEE Journal of Quantum Electronics*, vol. 25, No. 6, Jun. 1989, pp. 1196–1197.

TUNABLE OPTICAL PARAMETRIC OSCILLATOR

This invention is made with Government support under Grant No. N0014-87-K-2035 of the Naval Research Laboratory and Grant No. DMR85-16616, A01 and A02 of the National Science Foundation.

BACKGROUND OF THE INVENTION

The present invention relates, in general, to optical parametric oscillators, and more particularly, to a broadly tunable optical parametric oscillator which is tunable in the visible and in the near infrared.

Low-temperature phase barium metaborate ($\beta$-Ba$_2$O$_4$) is a newly discovered nonlinear optical material which holds much promise in frequency conversion applications, as described in U.S. patent application Ser. No. 373,064, filed June 26, 1989 and assigned to the assignee of the present application, now abandoned and replaced by FWE Ser. No. 07/581,090, filed Sept. 11, 1990. Particularly attractive properties of beta barium metaborate are its broad transparency, large optical nonlinearity, large birefringence, high optical damage threshold, and large fracture temperature. Applications such as the generation of efficient coherent ultraviolet light, high average power frequency conversion and frequency doubling of ultrashort pulses benefit from these properties.

There remains, however, a continuing need for light sources at wavelengths in the visible and near infrared which incorporate suitable characteristics such as tunability so as to permit the study of numerous ultrafast phenomena which have heretofore been inaccessible to direct optical study. Of particular value for many uses are light sources which are tunable through a broad range.

SUMMARY OF THE INVENTION

Briefly, the present invention is directed to the provision of a light source which is tunable in the visible and the near infrared. More particularly, the present invention provides an optical parametric oscillator which utilizes beta barium metaborate (BBO) to provide a broadly tunable source. In one embodiment of the present invention, a BBO crystal was placed in a parametric oscillator cavity which included two identical mirrors, the mirrors being about 50% reflective between 0.48 and 0.63 micrometers and less than 85% transmissive beyond 0.76 micrometers. The mirrors were placed 16 mm apart, corresponding to 50 cavity round trips for the 8 ns pump pulsing used for this oscillator. The pump pulse was obtained from the third harmonic of a commercial Q-switched Nd:YAG laser. A telescope was used to propagate the pump beam to the far field, yielding a 1 mm spot size at the entrance of the optical parametric oscillator (OPO) cavity. Robust parametric oscillation was obtained throughout the reflectivity range of the OPO mirrors, with stable optical parametric oscillation occurring throughout the visible and near infrared region. Tuning of the OPO was obtained by rotating the crystal in the OPO cavity to change the phase matching angle. The present invention thus is directed to the first successful operation of a $\beta$-BaB$_2$O$_4$ optical parametric oscillator (OPO) tunable in the visible and the near infrared. The OPO was pumped at 354.7 nm and was tunable throughout 0.45–1.68 $\mu$m. A maximum total energy conversion efficiency of 9.4% was measured from the OPO containing a 10.5×10.5 mm$^2$×11.5 mm long, 30° cut $\beta$-BaB$_2$O$_4$ crystal. Using the optical parametric luminescence technique, the 354.7 nm and 266 nm pumped OPO tuning curves (type I and type II) in $\beta$-BaB$_2$O$_4$ have been measured throughout the ~0.3–3.3 $\mu$m range.

BRIEF DESCRIPTION OF THE DRAWINGS

The foregoing, and additional objects, features and advantages of the present invention will become apparent to those of skill in the art from the following detailed description of a preferred embodiment, taken in conjunction with the accompanying drawings, in which.

DESCRIPTION OF PREFERRED EMBODIMENTS

Crystals utilized in an embodiment of the present invention were grown utilizing the high-temperature top-seated growth technique described, for example, by Jaing et al, "Flux Growth of Large Single Crystals of Low Temperature Phase Barium Metaborate", *Journal of Crystal Growth*, 79 (1986) 963–969. Optimization of the crystal growth parameters has led to the routine production of large single-crystal $\beta$-BaB$_2$O$_4$ boules. The as-grown boules were typically $\phi$45–60 mm×12 mm, although boules up to 15 mm thick have been obtained. Single crystals as large as 1 cm$^3$ have been cut from these boules for characterization and device applications. Prior experimental work on $\beta$-BaB$_2$O$_4$ has been performed on crystals grown in the Fujian Institute for Research on the Structure of Matter, People's Republic of China, as reported by Jiang et al, and it was, therefore, important to confirm that the crystals obtained for the reduction to practice of the present invention were the same as those grown by the Fujian researchers. Table I compares the properties of the crystals.

TABLE I

| Properties | Our Crystals | Fujian crystals |
|---|---|---|
| n$_0$ at 632.8 nm | 1.664 | 1.6681[a] |
| n$_e$ at 632.8 nm | 1.547 | 1.5506[a] |
| UV cutoff | 190.5 nm | 190 nm[b,c] |
| IR cutoff | 3.28 $\mu$m | ~3.3 $\mu$m[a] |
| $\theta_{pm}$, I[a,c] | 22.81 (±0.01)° | 22.7° |
| $\theta_{pm}$, II[a,c] SHG at 1.064 $\mu$m | 32.7° | 32.4° |
| [Na$^+$] impurity | <100 ppm | 50 ppm[d] |

Measurement of the complete second-harmonic generation (SHG) tuning curve in our crystals yielded results that are in complete agreement with published SHG tuning curve for $\beta$-BaB$_2$O$_4$. Furthermore, the physical properties of the crystals obtained from different crystal growth runs were high reproducible.

Figure 1:
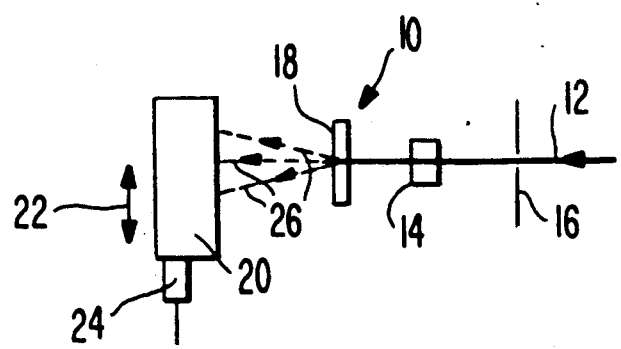
FIG. 1 is a diagrammatic illustration of apparatus for collinear optical parametric luminescence measurement of optical parametric oscillator tuning curves.

The optical properties of $\beta$-BaB$_2$O$_4$ have been investigated by several research groups. Based on the measurement of the dispersion of the refractive indices and the harmonic generation tuning curves of $\alpha$-BaB$_2$O$_4$ in the visible and the ultraviolet, several sets of Sellmeier equations have been proposed. To determine the most appropriate pair of Sellmeier equations for $\beta$-BaB$_2$O$_4$ and to test the validity of these equations near the infrared (IR) absorption edge, the optical parametric luminescence technique described by C. L. Tang in *Treatise in Quantum Electronics*, edited by H. Rabin and C. L. Tang, Academic, New York, 1973, pp 419-446, was used to measure the OPO tuning curves throughout the transparency range of $\beta$-BaB$_2$O$_4$. A schematic of the experimental setup 10 is shown in FIG. 1. The collimated pump beam 12 at 354.7 nm (or 266 nm) was launched into the crystal 14 through a spacial filter 16, as an extraordinary wave. The collinear parametric luminescence passes through a UV cutoff filter 18 and enters a Schoeffel 0.2 m double grating monochromator 20 mounted on a linear translation stage. Translation of the monochromator normal to the direction of the pump beam allows selection of the phase matching condition (collinear or noncollinear). To efficiently filter out the intense UV pump radiation, we used as filter 18 a 0.5" thick lucite sheet for the 354.7 nm radiation and a dilute CuSO$_4$ solution for the 266 nm radiation, respectively. The visible output of the parametric luminescence was detected with a red sensitive photomultiplier tube 24. For type I interaction, the collinear parametric luminescence output is an extremum in wavelength and in the present case, it gives the longest luminescence wavelength. Lateral translation of the monochromator allows the search for this longest wavelength, indicated by the dashed lines 26, and, therefore, the accurate determination of the OPO tuning curves. This is, however, not true for type II interaction, in which case care had to be taken to assure that the entrance slit of the monochromator was located at the collinear parametric luminescence output direction. Due to the short interaction length of the $\beta$-BaB$_2$O$_4$ crystal ($\sim$5 mm) used, and the small crystal rotation angle, the lateral displacement of the beam did not exceed 1 mm at the detector, corresponding to an experimental uncertainty in wavelength of $\pm 1$ nm in the visible, or $\pm 15$ nm in the infrared.

Figure 2:
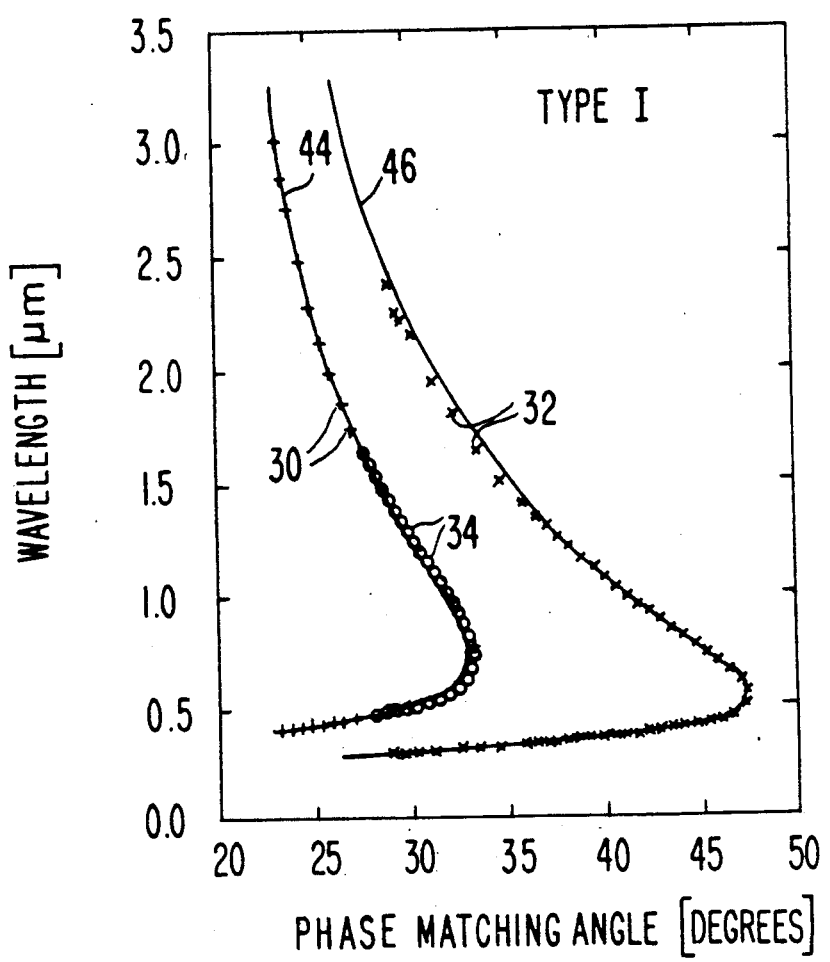
FIG. 2 illustrates Type I optical parametric tuning curves in $\beta$-BaB$_2$O$_4$.

The 354.7 nm and 266 nm pumped type I OPO tuning curves were taken with two $\sim 10 \times 5$ mm$^2 \times 9$ mm $\beta$-BaB$_2$O$_4$ crystals, which were cut at $\{\theta = 30°, \phi = 90°\}$ and $\{\theta = 40°, \phi = 90°\}$. In the type II OPO tuning curve measurement, an $\sim 8 \times 8$ mm$^2 \times 5$ mm crystal cut at $\{\theta = 40°, \phi = 0°\}$ was used. The results are presented in FIGS. 2 and 3, respectively. Both the 30° and 40° type I cut crystals gave identical OPO tuning curves with 354.7 nm and 266 nm pumpings. In FIG. 2, the values denoted by the "+" and the "X" symbols, indicated at 30 and 32, respectively, represent parametric luminescence data for 354.7 nm and 266 nm pumps, respectively. The "O" symbols indicated at 34 denote 354.7 nm pumped parametric oscillation.

Figure 3:
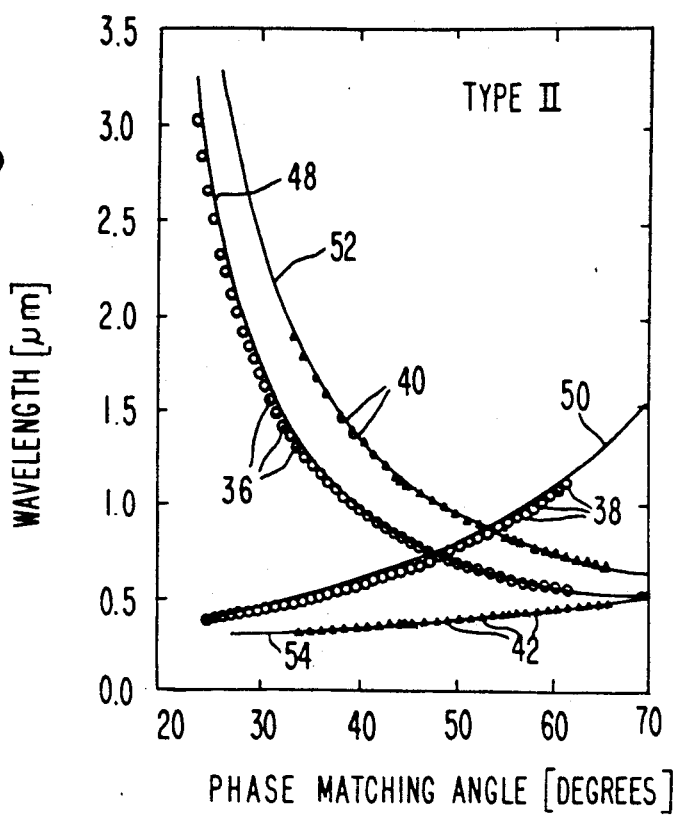
FIG. 3 illustrates Type II optical parametric tuning curves in $\beta$-BaB$_2$O$_4$.

In FIG. 3, type II parametric tuning curves in $\beta$-BaB$_2$O$_4$ are shown. The symbols O, indicated at 36 and 38, are collinear optical parametric luminescence data pumped at 354.7 nm, while the symbols $\Delta$, indicated at 40 and 42, are collinear optical parametric luminescence data pumped at 266 nm.

Of the several sets of Sellmeier equations proposed for $\beta$-BaB$_2$O$_4$, we found that the Sellmeier equations reported by D. Eimerl et al, *J. Appl. Phys.* 62, 1968 (1987) gives the best overall fit to our experimental OPO tuning curves. The solid lines 44, 46, 48, 50, 52 and 54 in FIGS. 2 and 3 are calculations based on these equations. The good agreement of the calculated tuning curves with our data suggested that these equations are, for all practical purposes, valid in the 1.5-3.3 $\mu$m region as well, and it is unnecessary to include any infrared pole in the Sellmeier equations.

Figure 4:
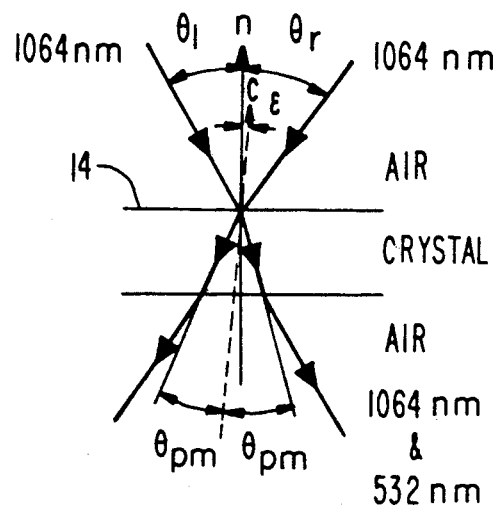
FIG. 4 is a diagrammatic illustration of a procedure for obtaining second harmonic generation phase matching angles.

In the above measurement, to rule out any measurement errors introduced in the crystal fabrication process, we used the type I SHG phase matching angle at 1.064 $\mu$m, denoted as $\theta_{pm}'$ to calibrate the orientation of the $\beta$-BaB$_2$O$_4$ crystals (i.e., the crystal normals) used. Absolute determination of the $\theta_{pm}'$ was done by obtaining the SHG on both sides of the optic axis, see FIG. 4, in another c-cut crystal. It is easy to show that, for type I interaction in a negative uniaxial crystal, the phase matching angle $\theta_{pm}'$ is given by $$\theta'_{pm} = \frac{1}{2}\left[\sin^{-1}\left(\frac{\sin\theta_l}{n_o}\right) + \sin^{-1}\left(\frac{\sin\theta_r}{n_o}\right)\right],$$

where $\theta_l$ and $\theta_r$ are the external SHG phase matching angles measured, $n_O$ is the ordinary refractive index at 1.064 $\mu$m, and $\epsilon$ [see FIG. 4] is the crystal fabrication "error" (i.e., the angle between the crystal normal and the optic axis). For the c-cut crystal above, the $\theta_{pm}'$ was found to be 22.81°$\pm$0.01° which is the value reported in Table I. To test the accuracy of this simple method, we measured th $\theta_{pm}'$ in several unoriented crystal samples, with $\epsilon$ ranging from 0.2° to 6.5°. The conoscopic pattern was used to place the optic axis of these crystals in the plane of incidence prior to the SHG measurement. The average value of $\theta_{pm}'$ was found to be 22.81°$\pm$0.07°, in good agreement with the value given in Table I. The larger error is believed to be due to the curvature of the crystal surfaces and to the uncertainty in placing the optic axis in the plane of incidence. This simple technique may be useful in the measurement of the phase matching properties of a new nonlinear optical material, where large crystal samples are often unavailable. This method may be extended to positive uniaxial crystals and to parametric luminescence measurement.

Figure 5:
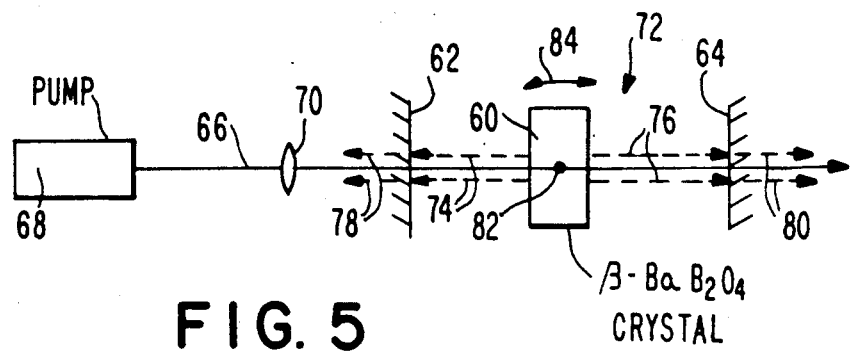
FIG. 5 is a diagrammatic illustration of an optical parametric oscillator using $\beta$-BaB$_2$O$_4$.

In an embodiment of the present invention illustrated in FIG. 5, a 10.5$\times$10.5 mm$^2 \times$11.5 mm long $\beta$-BaB$_2$O$_4$ crystal 60 was used to obtain optical parametric oscillation in the visible and near IR. The crystal was cut at $\theta = 30.2°$ and was uncoated. Type I interaction was used to maximize the parametric gain and the angular tuning rate. The singly resonant oscillator consisted of two identical dichroic mirrors 62 and 64 which were about 50% reflective between 0.48 and 0.63 $\mu$m and less than 85% transmissive beyond 0.76 $\mu$m. The mirrors were placed 16 mm apart corresponding to about 50 cavity round trips for the 8 ns pump pulse 66 used in this experiment. The pump pulse 66 was obtained from the third harmonic of a commercial Q-switched neodymium-doped yttrium aluminum garnet (Nd:YAG) laser 68. A 3:1 telescope 70 was used to propagate the pump beam to the far field, yielding a 1 mm spot size at the entrance of the OPO, which is generally indicated at 72.

The pump beam 66 enters the OPO 72 through dichroic mirror 62, propagates through the crystal 60, and exits the OPO by way of dichroic mirror 64. Oscillation is stimulated in the cavity 72, as indicated by dotted lines 74 and 76 representing oscillator output beams travelling in both directions in the cavity. The mirrors 62 and 64 partially reflect and partially transmit the beams 74 and 76, depending upon the coatings on the mirror surfaces. The partial transmissivity of either or both of the mirrors 62 and 64 allows either or both of the corresponding output beams 78 and 80, respectively, to exit the OPO 72. Although an operational embodiment of the invention utilized mirrors coated for 50% reflectivity and 85% transmissivity at specified wavelengths, other values can be utilized. At a pump intensity of ~130 MW/cm$_2$, the spontaneous parametric luminescence cone was readily observable and was used to aid in the alignment of the OPO.

Robust parametric oscillation was obtained throughout the reflectivity range of the OPO mirrors (0.48–0.63 μm and 0.81–1.36 μm) although weaker oscillation was also observed through the degenerate point and down to 0.45 μm where the reflectivity of the mirrors is only 25%. The conversion efficiency was measured with the signal wavelength at 505 nm, corresponding to an internal phase matching angle of 30.2°. The total energy conversion efficiency was 9.4% with an input pump energy of 15 mJ/pulse. The calculated parametric oscillator threshold, neglecting the effect of walk off and Fresnel loss, was ~5.3 mJ/pulse.

The oscillator 72 was tunable by rotation of the crystal 60 about an axis 82, as indicated by the arrows 84. This rotation changes the phase matching angle $\theta_{pm}$ as illustrated in FIG. 4, and determines the frequency of the oscillator outputs 78 and 80.

Stable optical parametric oscillation was also observed throughout the visible and near infrared (IR) region using the 10×5 m$^2$×9 mm BBO crystal cut at $\theta = 30°$, described above.

Thus, there has been described the first operation of a $\beta$-BaB$_2$O$_4$ optical parametric oscillator tunable in the visible to near-IR, including the important blue-green region. Stable oscillation tunable from 0.45 to 1.68 μm has been demonstrated with a 354.7 nm pumped $\beta$-BaB$_2$O$_4$ OPO. A maximum total energy conversion efficiency of 9.4% was obtained using an 11.5-mm-long crystal. The high UV damage threshold of $\beta$-BaB$_2$O$_4$ observed (>0.4 GW/cm$^2$ at 354.7 nm and >10$^5$ pulses) suggests that very high total energy conversion efficiency can be obtained with the OPO by simply increasing the mirror reflectivity and the mirror damage threshold. In addition, we have verified the broad tunability of a $\beta$-BaB$_2$O$_4$ OPO pumped with the 3rd and 4th harmonics of a Nd:YAG laser by directly measuring the tuning curves. Careful measurement of these tuning curves with the parametric luminescence technique determines for the first time the validity of the published Sellmeier equations in the 1.5–3.3 μm range. These results clearly indicate that $\beta$-BaB$_2$O$_4$ is particularly suitable for the construction of a compact, solid-state radiation source broadly tunable throughout the UV, visible, and the near-IR.

Although the invention has been described in terms of a preferred embodiment, it will be apparent that variations and modifications can be made without departing from the true spirit and scope thereof, as defined in the following claims.

What is claimed is:

1. A broadly tunable optical parametric oscillator having high total energy conversion efficiency and having a high UV damage threshold, comprising:

an oscillator cavity defined by at least first and second spaced dichroic mirrors, at least one of which is partially transparent to light oscillation in said cavity;

a $\beta$-BaB$_2$O$_4$ crystal located in said cavity, said crystal having first and second generally parallel faces and having an axis parallel to said faces, said crystal being rotatable about said axis;

a laser pumping source producing an output beam at a predetermined wavelength;

optical means directing said laser pumping output beam into said cavity and onto a surface of said crystal to stimulate light oscillation in said crystal and in said oscillator cavity, said oscillation being tunable in the visible and near infrared through a wavelength range of 0.3 to 3.3 μm by rotation of said crystal about said axis to vary the phase matching angle of said crystal with respect to said pumping source output beam; and means for transmitting at least a part of said oscillation out of said cavity.

2. The oscillator of claim 1, wherein said means for transmitting at least a part of said oscillation out of said cavity includes a partially transmissive coating on at least one of said mirrors.

3. The oscillator of claim 1, wherein said first and second mirrors are located on opposite sides of said crystal and are aligned therewith to form a linear cavity, said crystal having an optic axis generally aligned with said linear cavity, sand wherein said means directing said laser pumping beam onto a surface of said crystal includes said first mirror, said crystal being substantially transparent to the wavelength of said pump beam whereby said pump beam enters said cavity by way of said first mirror, impinges on and passes through said crystal, and exits said cavity by way of said second mirror.

4. The oscillator of claim 3, wherein said pump beam impinges on said crystal at an angle with respect to said crystal optic axis, said angle being adjustable by said rotation of said crystal about said axis of rotation.

5. The oscillator of claim 4, wherein said pumping beam is directed through said crystal at a selected angle with respect to said crystal optic axis to produce oscillation in said cavity.

6. The oscillator of claim 5, wherein said second mirror is at least partially transparent to said oscillation to produce an output beam having a total energy conversion efficiency of at least 9.4% of the total energy input of said pump beam.

* * * * *